(No Model.)
E. A. SEALE & W. W. DOWNING.
VEHICLE WHEEL.
No. 375,775. Patented Jan. 3, 1888.
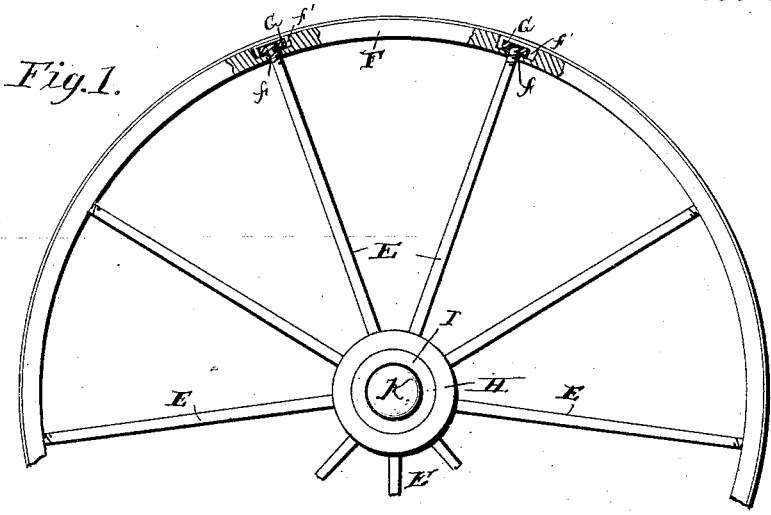
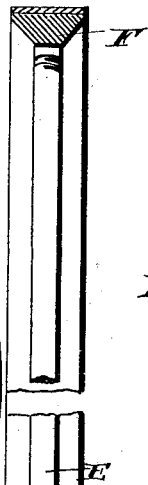
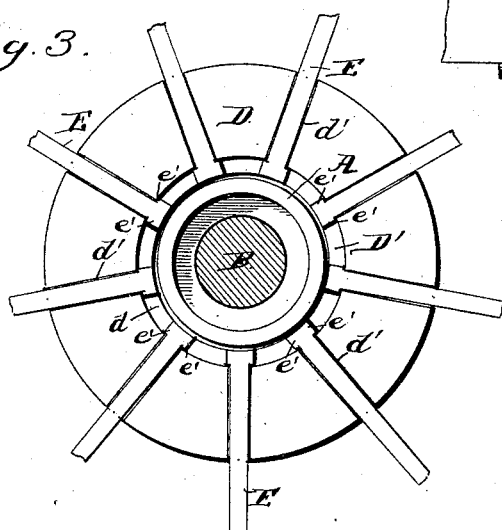
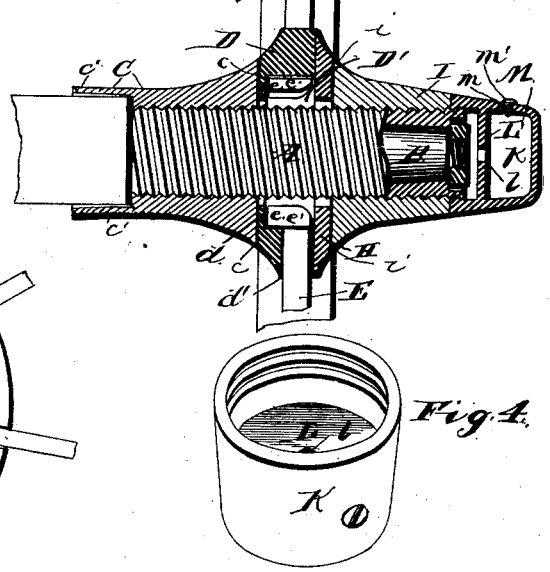
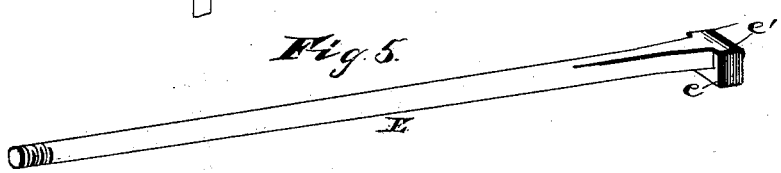
Witnesses
Geo. Thrope.
C. E. Doyle.
Inventors
E. A. Seale
W. W. Downing
By their Attorneys

UNITED STATES PATENT OFFICE.

ELIAS ALLEN SEALE AND WILEY WILLIAM DOWNING, OF BREWTON, ALABAMA.

VEHICLE-WHEEL.

SPECIFICATION forming part of Letters Patent No. 375,775, dated January 3, 1888.

Application filed September 29, 1887. Serial No. 251,058. (No model.)

*To all whom it may concern:*

Be it known that we, ELIAS ALLEN SEALE and WILEY WILLIAM DOWNING, citizens of the United States, residing at Brewton, in the county of Escambia and State of Alabama, have invented new and useful Improvements in Vehicle-Wheels, of which the following is a specification.

Our invention relates to improvements in vehicle-wheels; and it consists in a certain novel construction and arrangement of parts, fully set forth hereinafter, and specifically pointed out in the claims.

In the accompanying drawings, Figure 1 is a front view of a portion of the wheel. Fig. 2 is a central section thereof. Fig. 3 is a front view of the wheel with the oil cup or cap and the thimble removed, showing the manner of securing the inner ends of the spokes in place. Fig. 4 is an inside view of the cap or oil-cup. Fig. 5 is a detail view of one of the spokes.

Referring by letter to the drawings, A designates the sleeve or box of the wheel, which is adapted to receive the axle B and rotate thereon, and the outer end of the said box is recessed to receive the nut which is secured on the end of the axle.

The box A is threaded on the outside, and on the inner or rear end of the same is screwed the thimble C, which is flared or spread toward the outer end, thus providing a shoulder, c. The inner end of the said thimble is provided with an inwardly-extending flange, c', to fit over the shoulder at the inner end of the spindle of the axle.

D represents a collar fitting around the sleeve A, and provided at the inner edge on the outer side with an annular recess, D', extending through almost to the inner side of the collar, and leaving merely a flange, d, (on the inner side,) to fit the sleeve A. The outer side or face of the collar D is further provided with a series of radial grooves or recesses, d', which communicate with the interior annular recess, D'.

E E designate the spokes, which are adapted to rest in the radial slots or recesses in the collar D, and the ends of the spokes projecting into the annular recess are bent laterally to form arms e e, extending toward the inner side of the collar and concealed in the said annular recess. Shoulders e' e' are formed on the opposite sides of the spokes to engage the annular shoulder at the inner edge of the collar or the shoulder formed by the annular recess, thus preventing the spokes from being drawn through the radial recesses when a strain is put upon them. The outer ends of the spokes are threaded and passed through openings or perforations f in the rim or felly F. The outer side of the said rim is recessed or countersunk, as seen at f', to receive the taps G, which are screwed on the projecting ends of the spokes. By means of the said taps or nuts the spokes may be drawn very tight, and thus render the wheel very rigid. It will be understood that the tire will conceal the recesses in the outer side of the rim. The radial recesses in the collar D are made of such a depth as to receive the entire width of the spokes, and thus bring the outer sides of the spokes flush with the outer side of the collar.

H designates a washer which is placed against the outer side of the collar D to cover the ends of the spokes, and it will be seen that the washer is shaped in exact imitation of the opposite side of the collar, so that when the washer is in place the said collar is symmetrical in appearance, both the inner and outer sides being exactly alike.

I designates a thimble which is screwed on the sleeve A and forced up tight against the outer side of the washer H, and the inner side or end of the said thimble is flared or spread to form a shoulder, i. It will thus be seen that the collar D is firmly clamped between the opposing shoulders of the thimbles C and I and there is no chance for lateral movement thereof.

The inner side of the collar D and the outer side of the washer H are beveled or tapered in any preferred manner, and the flared outer end of the thimble C and inner end of the thimble I are designed to continue the bevel or taper, so as to cause the entire hub to have the appearance of being formed in one piece.

The sleeve A projects slightly beyond the outer end of the outer thimble, I, and on the said projecting end is screwed the cap K, which fits over and completely conceals the nut or tap on the end of the axle-spindle. A partition or web, L, is formed in the cap a short distance from the outer end, and provided at the center with a small opening or perforation, $l$. The compartment M, which is thus formed in the end of the cap K, is designed as an oil-cup, and it communicates by means of the perforation $l$ with the end of the sleeve which contains the spindle. An opening, $m$, is formed in the side of the oil cup or compartment M to allow oil to be introduced thereinto, and the said opening is provided with a screw-cap, $m'$.

As the wheel rotates, the oil which is in the oil-cup will work very slowly through the perforation in the web L and find its way to the interior of the sleeve. A very small quantity of oil is necessary to lubricate a journal which is in proper condition, and more than the necessary amount not only is a waste of the material, but it tends to impede rather than aid the operation of the journal. It is our desire to provide an oil-cup for wheel-journals which will deliver the oil as it is needed. This oil-cup is so fixed, however, that even should an unnecessarily large amount of oil escape from the cup it could not work its way to the outside of the hub, as the cap K is screwed tightly against the outer end of the thimble I.

The advantages of constructing a wheel as herein described will now be seen.

If a spoke should be broken or become loose, it may be replaced or tightened by simply removing the cap and the thimble I. If it is to tighten it, simply remove the inner end of the spoke from the radial slot in which it is secured, turn it the desired number of times, and replace it in the slot. Further, if the box should become worn it may be removed and replaced by a new one without calling in the aid of a wheelwright.

A wheel constructed as herein described may be more easily put together when first made, as will be readily seen. The spokes are designed to be of the same shape as the buggy-spokes now in use; but the material used in these spokes is preferably steel.

The appearance of this wheel is also lighter, whereas it may be made very strong, so as to withstand a tremendous strain. The ends of the spokes may, if preferred, be screwed into the rim, (especially if the wheel is metallic;) but the taps are used on the ends of the spokes to guard against the danger of the threads in the rim being stripped. If the threads in the tap are stripped, a new tap may be supplied, but in the other case it would cause more trouble. The spokes may be formed at the inner ends with simply the lateral arm to engage in the annular recess in the collar; but we prefer to provide the shoulders on opposite sides to engage the shoulders at the inner ends of the radial slots, as hereinbefore fully described.

This wheel may be very cheaply made, and as the sleeve or box is the only part thereof which is liable to wear out (and this may be replaced very easily and cheaply) it will be seen that the wheel is very economical.

A still further and very important advantage of the construction herein described is that the wheel may be lubricated without removing any of the parts thereof, as the oil is simply introduced through the opening $m$ in the side of the oil-cup, from whence it is directed by the rotation of the wheel to the interior of the box.

Having thus described our invention, we claim—

1. The combination, with the collar having a series of radial slots therein, of the spokes adapted to be inserted at the inner ends in the said slots and having shoulders $e'$ thereon to engage the inner edge of the collar and the threaded outer ends, the rim having a series of openings therein adapted to receive the ends of the spokes, and the taps on the projecting threaded ends of the spokes, substantially as and for the purpose specified.

2. The combination, with the collar, of the spokes secured at the inner ends therein and having threaded outer ends, the rim having a series of openings therein to receive the ends of the spokes, and the recesses $f'$ in the outer side around the said openings, and the taps adapted to be received in the said recesses and screwed on the projecting ends of the spokes, substantially as and for the purposes specified.

3. In a wheel, the combination, with the box or sleeve A, threaded on the outer side, of the collar D, secured thereon and having the inner ends of the spokes secured thereto, the thimble C, screwed on the sleeve on the inner side of the collar, the thimble I, screwed on the sleeve on the outer side of the collar, and the cap L, screwed on the end of the sleeve to cover the tap on the end of the spindle which passes through the sleeve, substantially as specified.

4. In a wheel, the combination, with the exteriorly-threaded sleeve or box A, of the collar D, surrounding said sleeve and having the annular recess D' and the radial recesses or slots $d'$, communicating therewith, the spokes E, secured at the inner ends in the said slots and having the lateral arms $e$, to engage in the annular recess, and the thimbles C and I, to be screwed on the sleeve A on opposite sides of the said collar to hold it in place, substantially as specified.

5. In a wheel, the combination, with the sleeve A, of the collar D, secured thereon and having the annular recess D' and the radial slots $d'$, communicating therewith, and the spokes E E, inserted at the inner ends in the said slots and having the lateral arms $e$ $e$, to engage in the annular recess, and the shoulders $e'$ $e'$ on opposite sides to engage the inner edge of the said recess, substantially as and for the purpose specified.

6. In a wheel, the combination, with the sleeve or box A, of the collar D, having the radial slots $d'$ in the outer side to receive the inner ends of the spokes, the washer H, to bear against the outer side of the collar and conceal the ends of the spokes, and the thimbles C and I, screwed on the sleeve A on opposite sides of the collar to bind the same and the washer H firmly in position, substantially as and for the purpose specified.

7. In a wheel, the combination, with the exteriorly-threaded sleeve A, of the collar D, surrounding the sleeve and having the interior annular recess, D', and the radial slots d', communicating therewith, the spokes E, secured at the inner ends in the said slots and having enlargements to engage in the said annular recess, the washer H, to bear against the outer sides of the spokes, and the taps or thimbles C and I, to screw on the sleeve A on opposite sides of the collar to bind the same and the said washer together, substantially as and for the purpose specified.

8. In a wheel, the combination, with the exteriorly-threaded sleeve or box A, of the collar D, having the inner ends of the spokes secured therein, the inner thimble, C, and outer thimble, I, and the cap L, secured on the end of the sleeve and having the oil-reservoir M therein, communicating with the bearing of the wheel, substantially as and for the purpose specified.

9. In a wheel, the combination, with the box or hub screw-threaded at the outer end, of the cap L, screwed thereon and having the partition or web L' therein, provided with a perforation, l, and the opening m in the side, provided with a screw-cap, m', all constructed and arranged as and for the purpose specified.

10. In a wheel, the combination of the exteriorly-threaded box or sleeve A, the thimble C, screwed thereon and having the flared outer end forming the shoulder c, and the inward-extending flange c' on the inner end, the collar D, bearing against the shoulder c and having the inner ends of the spokes secured thereto, the thimble I, screwed on the sleeve and having the flared inner end forming a shoulder, i, to bear against the outer side of the said collar, and the cap or oil-cup L, screwed on the end of the sleeve over the end of the spindle extending through the said sleeve, and having the opening m in the side thereof to receive the oil to lubricate the journal, substantially as and for the purpose specified.

In testimony that we claim the foregoing as our own we have hereto affixed our signatures in presence of two witnesses.

ELIAS ALLEN SEALE.
WILEY WILLIAM DOWNING.

Witnesses:
JAMES ANDERSON SEALE,
MILTON A. ROBB.